(12) United States Patent
Sawyer

(10) Patent No.: US 6,499,192 B1
(45) Date of Patent: Dec. 31, 2002

(54) ATTIC DOOR PULL

(76) Inventor: Gerald F. Sawyer, 2862 Treetop Rd., Dacula, GA (US) 30211

( * ) Notice: Subject to any disclaimer, the term of this patent is extended or adjusted under 35 U.S.C. 154(b) by 0 days.

(21) Appl. No.: 09/882,679

(22) Filed: Jun. 18, 2001

(51) Int. Cl.⁷ .................. A45C 13/28; F16G 15/00
(52) U.S. Cl. ........................ 16/442; 24/116 A
(58) Field of Search .............. 16/442; 24/116 A

(56) References Cited

U.S. PATENT DOCUMENTS

| | | | | |
|---|---|---|---|---|
| 948,109 A | * | 2/1910 | Harrigan | 16/433 |
| 1,173,896 A | * | 2/1916 | Thomas | 16/442 |
| 1,460,694 A | * | 7/1923 | Arzinger | 16/442 |
| 1,504,761 A | * | 8/1924 | Hubbell | 24/116 A |
| 1,523,357 A | * | 1/1925 | King | 24/116 A |
| 1,575,161 A | * | 3/1926 | Grode | 24/115 R |
| 1,735,305 A | * | 11/1929 | Tregoning | 16/442 |
| 1,769,245 A | * | 7/1930 | Tregoning | 16/442 |
| RE17,970 E | * | 2/1931 | Cook | 192/13 R |
| 2,036,172 A | * | 3/1936 | Gagnon | 24/116 A |

* cited by examiner

Primary Examiner—Robert E. Pezzuto
Assistant Examiner—Tara L. Mayo
(74) Attorney, Agent, or Firm—Rodgers & Rodgers

(57) ABSTRACT

An attic door pull having a ball chain attached to an attic door at one end and a finial attached to the other end by a coupler. The coupler includes a bore and the balls of the ball chain disposed in the bore are of a diameter less than the remaining balls.

4 Claims, 1 Drawing Sheet

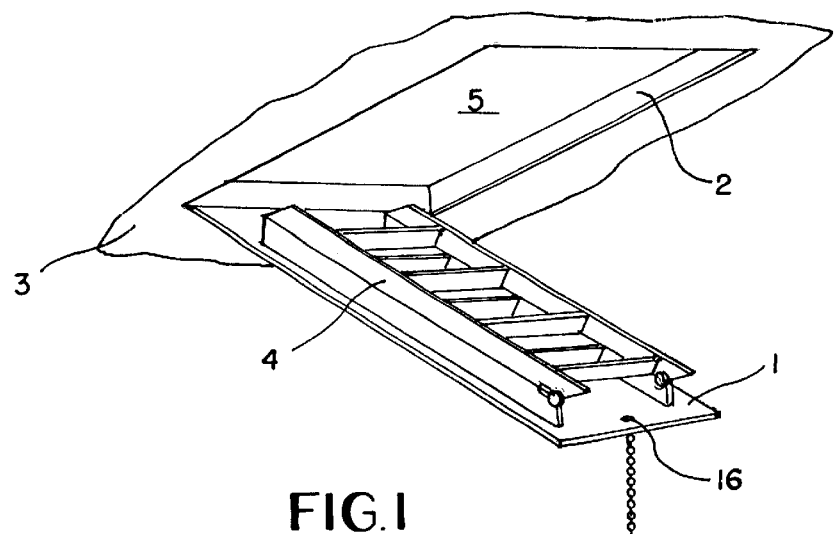
FIG. 1
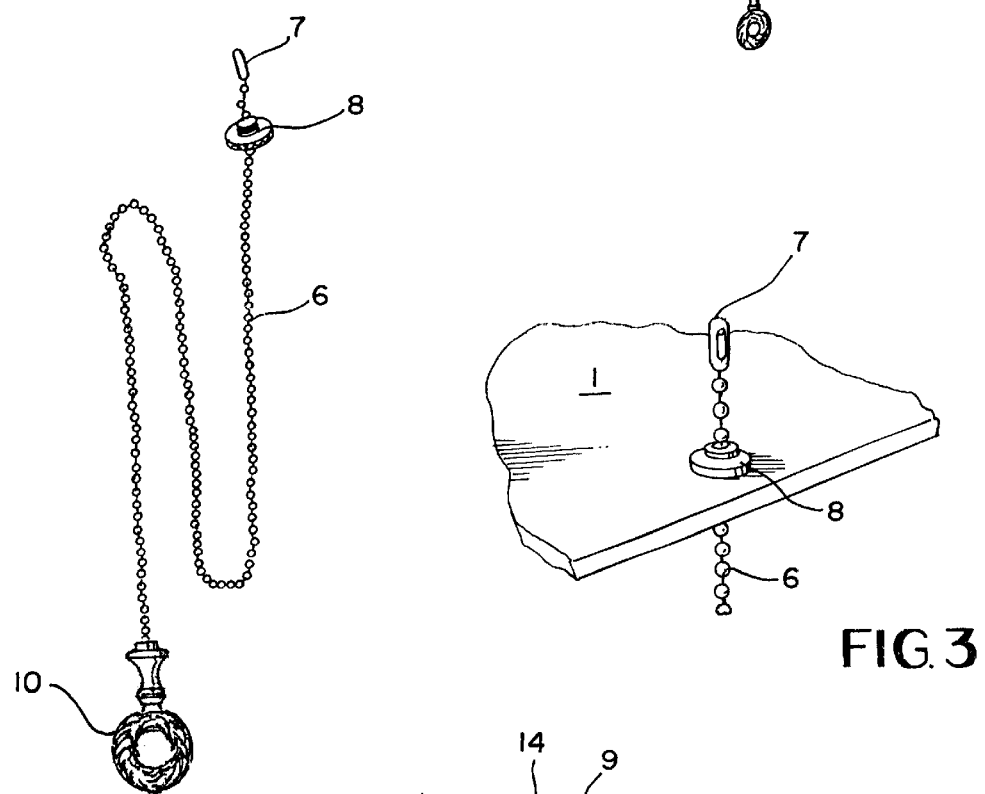
FIG. 2
FIG. 3
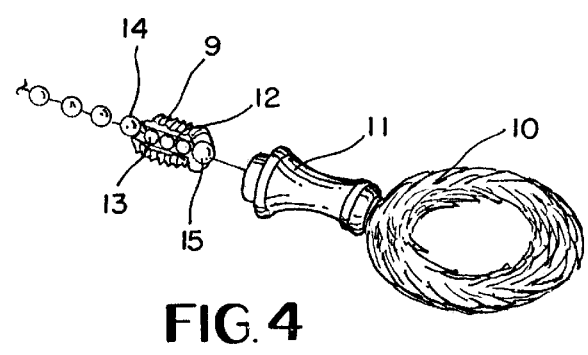
FIG. 4

ATTIC DOOR PULL

BACKGROUND OF THE INVENTION

This invention relates to hidden folding attic stairways attached to an attic door such that the stairway is hidden from view and stored in the attic when not in use. Typically, folding attic stairways are not often used such that the attic door hinges become rusty thereby requiring that a great deal of tension be applied to the opening mechanism when the attic door is pulled down. Normally, attic doors are opened by means of a rope-type pull with a functional pull element attached to the free end thereof. Of course, these rope pulls are quite unsightly and tend to fail over time through normal degradation of the rope fiber.

SUMMARY OF THE INVENTION

According to this invention, an attic door pull is provided wherein a ball chain is connected to an attic door at one end thereof and a coupler is attached to the other end thereof. A hollow bore is formed in the coupler and the ball chain is disposed within the bore so that the balls within the bore are of a smaller diameter than the remaining balls of the ball chain and wherein a finial is attached to the coupler.

BRIEF DESCRIPTION OF THE SEVERAL VIEWS OF THE DRAWING

In the drawing:

FIG. 1 is a perspective view showing the attic door pull attached to an attic door according to this invention;

FIG. 2 is an elevational view showing the attic door pull;

FIG. 3 is an enlarged perspective view showing the attic door pull attached to the attic door; and FIG. 4 is an enlarged perspective view showing the finial attachment means.

DETAILED DESCRIPTION OF THE INVENTION

In the drawings and with particular reference to FIG. 1, the numeral 1 designates a conventional attic door hingedly attached to ceiling frame 2 which in turn is mounted in ceiling 3, as is well known. Folding attic stairway 4 is attached to attic door 1, in conventional manner, such that folding attic stairway 4 is disposed in attic space 5 when attic door 1 is in the closed position.

The attic door pull, according to this invention, is depicted in FIG. 2 and is provided with brass ball chain 6 with splicing pendant 7 attached to one end thereof. In addition, knurled locknut 8 is slidably mounted on ball chain 6. To complete the basic elements of the attic door pull, a threaded coupler 9 is secured to ball chain 6 remote from splicing pendant 7 and is adapted to receive finial 10 by means of which finial base 11 is threadedly attached thereto in conventional manner.

Since attic doors are difficult to open due to nonuse over a period of time, it has been determined that in order to prevent undesirable breakage, ball chain 6 must have a 45 lb. tensile strength which naturally requires the balls to be of a certain diameter. In addition, coupler 9 is of a standard size in order to receive finial base 11 and the internal bore 12 of coupler 9 is of a standard diameter such that the diameter of the individual balls of ball chain 6 is greater than internal diameter of the internal bore 12 of coupler 9. In order to overcome this problem and still include a ball chain having a 45 lb. tensile strength, ball chain 6 comprises three stainless steel balls 13 between individual brass ball 14 disposed on one end of coupler 9 and terminal brass ball 15 disposed on the other end of coupler 9. By this means, ball chain 6 is receivable within bore 12 of coupler 9 by means of stainless steel balls 13 which are of a diameter smaller than the inside diameter of bore 12. Since terminal brass ball 15 is of a diameter larger than the inside diameter of bore 12, coupler 9 is securely affixed to one end of ball chain 6.

In order to install the attic door pull according to this invention, it is first simply necessary to remove the old pull from attic door 1 then, without finial 10 attached to coupler 9, coupler 9 and ball chain 6 are threaded through aperture 16 formed in attic door 1 such that locknut 8 is secured between the upper inside surface of attic door 1 and pendant 7, as best shown in FIG. 3. Following this, finial 10 is screwed onto coupler 9 by means of finial base 11 and the attic door pull, according to this invention, appears as shown in FIG. 1.

Therefore, by this invention, an attic door pull is provided which embodies sufficient tensile strength to eliminate the possibility of breakage even when used in connection with difficult to open attic doors. In addition, the attic door pull is of a pleasing appearance by the utilization of a finial of any desired shape and size.

What is claimed is:

1. An attic door pull comprising a ball chain, attachment means at one end of said ball chain to attach said chain to an attic door, a coupler disposed on said chain remote from said attachment means, said ball chain comprising a first set of connected balls of a predetermined diameter, said coupler comprising a hollow bore, the inside of said hollow bore being less than the diameter of said first set of balls, and said ball chain comprising a second set of balls disposed between two of said first set of balls and having respective diameters less than the internal diameter of said bore and being disposed within said bore.

2. An attic door pull according to claim 1 wherein said attachment means comprises a locknut and pendant combination.

3. An attic door pull according to claim 1 wherein said coupler is threaded and a finial is threadedly connected thereto.

4. An attic door pull according to claim 1 wherein said first set of balls are made of brass and said second set of balls are made of stainless steel.

\* \* \* \* \*